March 22, 1966     LA ROY B. PASSER     3,241,420
SELF-SUPPORTING HOLLOW-WALL FASTENING RECEPTACLE
Filed June 17, 1963
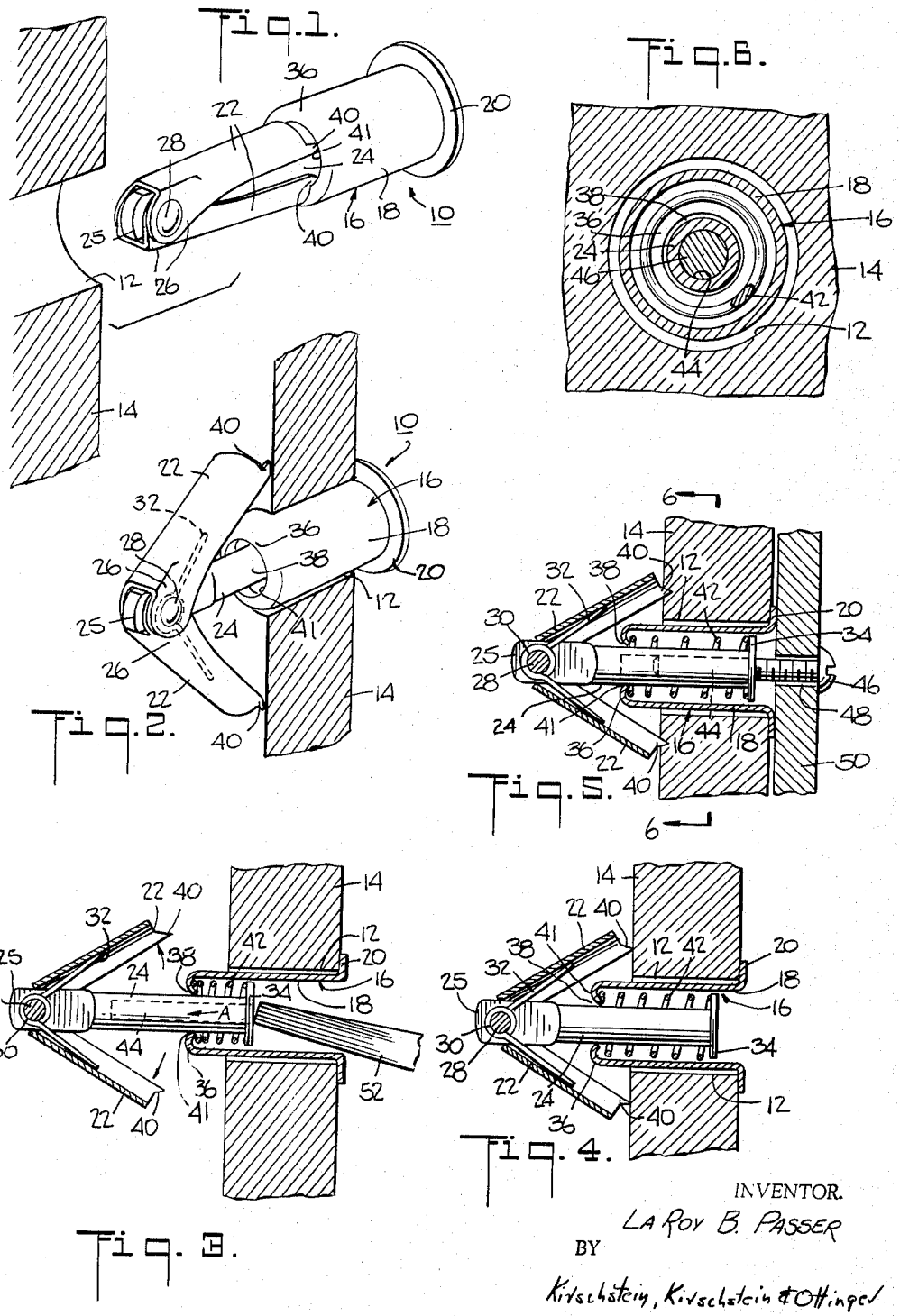
INVENTOR.
LA ROY B. PASSER
BY
Kirschstein, Kirschstein & Ottinger
ATTORNEYS

United States Patent Office 3,241,420
Patented Mar. 22, 1966

3,241,420
SELF-SUPPORTING HOLLOW-WALL
FASTENING RECEPTACLE
La Roy B. Passer, 107 Randall Ave., Port Jefferson, N.Y.
Filed June 17, 1963, Ser. No. 288,333
5 Claims. (Cl. 85—3)

This invention relates to hollow-wall fasteners and, more particularly, to a fastening receptacle adapted to be inserted into a hole in a hollow wall and to be readily and quickly self-secured thereto.

It is a primary object of my invention to provide a fastening receptacle of the character described which can be readily inserted into a hole in a hollow wall and which can be instantaneously caused to expand behind the wall and thence to grip the wall from both sides whereby the receptacle will be self-secured to the wall A hollow wall is one which contains a cavity or space in back of its exposed room surface. Where both surfaces of a wall are finished access to this space is impossible without destroying part of the wall. Such walls are common in the interiors of buildings and are typically of less strength than wooden or brick walls. Usual materials from which this type of wall is made are sheet rock, straw board, plaster, hollow gypsum blocks, cinder blocks and cement blocks. Since the tensile strength of the material from which this type of wall is formed is poor, it is not desirable to anchor a fastener such as a nail or screw into the wall itself; rather, it is better construction practice to utilize a specially designed fastener which will fit in a hole made in the wall which will compressingly grip the wall from both sides. Such a fastener utilizes the compressive strength of the wall material for its anchoring function rather than the wall's weaker tensile strength.

The rapid emplacement of a fastener of the type described into a hole having only one accessible end requires the solution to several heretofore unsolved problems. Obviously, the fastener can be manipulated from only one side. I have found it desirable that the fastener not require the use of a screw to cause it to expand on the hidden or hollow side of the wall, since the turning of a screw is a slow and exacting procedure. Use of a screw for this purpose requires the subsequent removal of the screw, placement of the screw through the object to be joined to the wall and reintroduction of the screw into the fastener, an inconvenient technique which I desire to avoid by means of my invention.

Other fasteners of which I am aware have the additional disadvantage that the screw utilized therewith can only be removed with the consequent loss of the fastener, i.e. the screw secures the fastener in place so that when the screw is removed, the fastener drops from the hole into the hollow area behind the wall. A new fastener must be used to replaec it, and the initial use of the fastener requires that the screw be first placed through the object to be fastened to the wall.

I desire to provide a fastening receptacle of the character described which overcomes the difficulties mentioned and which has the advantages deriving from their elimination. To this end, it is an object of my invention to provide a device of the character described which functions without the usual time-consuming necessity of turning a screw to expand the fastener in the hollow space behind the wall. However, I still desire to provide a threaded coupling to be engaged by a screw and for this reason my invention not being initially dependent on a screw for securement to a wall member is properly denominated as a fastening receptacle.

It is a further object of my invention to provide a fastening receptacle of the character described which can be speedily installed in position in a hole in a hollow wall, and which can be expanded to its secured position by the use of any common slender instrument such as a screw driver, nail or the like.

It is another object of my invention to provide a fastening receptacle of the character described which can be conveniently used in small projects around the home by do-it-yourself homeowners possessing a minimum of mechanical skill.

It is another object of my invention to provide a fastening receptacle of the character described which requires a minimum of parts, is economical and rapid in manufacture and which may thereby be merchandised at low cost competitive with other hollow-wall fasteners.

These and various other objects and advantages of my invention will become apparent to the reader in the following description.

My invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of my invention, FIG. 1 is a perspective view of my fastening receptacle in an infolded condition prior to insertion in a hole in a wall;

FIG. 2 is a perspective view of my fastening receptacle in a self-secured condition in a hole in a wall;

FIG. 3 is an axial cross-sectional view of the receptacle in an expanded but not yet secured condition;

FIG. 4 is a view similar to FIG. 3 but illustrating the receptacle in later lightly secured condition;

FIG. 5 is a view similar to FIG. 3 but illustrating a screw threaded into my receptacle and with the receptacle more firmly secured to the wall; and FIG. 6 is a transverse cross-sectional view taken substantially along the line 6—6 of FIG. 5.

Referring now in detail to the drawings, the reference numeral 10 denotes my fastening receptacle which is adapted to be inserted into a hole 12 in a hollow wall 14 and to secure itself to the wall by easy and practically instantaneous manipulation by a user.

The fastening receptacle 10 is generally elongated and has a main axis of symmetry coincident with the axis of symmetry of the hole 12 and perpendicular to the plane of the wall 14. The receptacle comprises a hollow body member 16 which supports and carries the remaining structure of the receptacle. The body member 16 is configured to enter into and then occupy the hole 12 and thereby to carry with it the other receptacle components. The body member 16 includes a thin-walled cylindrical ferrule 18 having its axis of symmetry coincident with the main axis of the receptacle 10 and having an outside diameter slightly less than that of the hole 12 into which it fits. The diameter of the ferrule is such that the body member 16 fits easily into the hole 12.

Stop means, which is part of the body member 16, positions the body member 16 in the hole 12 and seats against the accessible or exposed surface of the wall 14. The stop means comprises an annular lip 20 joined to and integral with the exposed or rear end of the ferrule 18. The lip 20 extends outwardly and transversely to the main axis of the receptacle 10. The lip 20 has a larger diameter than and hence a greater transverse outline than the hole 12 and so prevents movement of the body member 16 through the hole 12 beyond a point at which the rear end of the body member is approximately flush with the exposed wall surface. When placed in the hole 12, the lip 20 abuts the exterior or face of the wall 14 and the body member 16 is situated within and protrudes through the hole into the hollow opening behind the wall.

Transversely extendable means is carried by the body member 16 and is mounted for movement between a first position in which it has a transverse outline not greater than the cross-section of the hole 12 (and ferrule 18 of the body member 16) and a second position having a transverse outline greater than that of the hole (and ferrule 18 of the body member 16). The transversely extendable means includes two commonly-pivoted butterfly arms 22 mounted for rotation on a shank 24. Each arm 22 is similarly formed and is elongated and trough-shaped in transverse cross-section. Both arms 22 are mutually pivoted on a solid flattened and somewhat enlarged forward end 25 of the shank 24, i.e. the end most distant from the lip 20.

Each arm 22, on its pivoted end, has a pair of spaced, diametrically opposed, apertured ears 26, the ears of one arm nesting within the ears of the other arm. A rivet 28 extends through a transverse bore 30 in the forward end 25 of the shank 24 and has its axis of symmetry perpendicular to the flattened faces of the end of the shank. The ears 26 of each arm 22 are rotatably disposed about different ends of the rivet 28. The ends of the rivet 28 are headed to capture the ears 26 between them and an affiliated face of the forward end 25 of the shank 24.

The butterfly arms 22 may thus transversely pivot on the end of the shank 24 between their most inward and compressed (infolded) first position in which the troughs of the arms hug the shank 24 (see FIG. 1) and their most outward and extended (expanded) second position in which the arms extend outwardly and transversely from the body member 16 limited only by the abutment of the pivoted ends of the arms 22 against the shank 24. In the first mentioned position, the arms 22 have a mutual transverse outline smaller than that of the hole 12 (and the ferrule 18 of the body member 16). In the second mentioned position, the arms 22 have a much longer mutual transverse outline and thence block removal of the body member 16 from the hole.

Spring means biases the butterfly arms 22 to their extended position. Said means includes an elongated wire spring 32 having its central portion coiled about one side of the rivet 28 interiorly of a pair of ears 26 and its projecting ends lying within the troughs of the arms 22. The ends of the spring 32 press outwardly against the arms so as to urge the arms toward their expanded position.

The shank 24 is slidably captive within the body member 16. For this purpose, the rear-most end of the shank 24 mounts a flat collar 34. The forward end of the body member 16 is rimmed to form a convex internally-cupped flange 36 defining an aperture 38 in this end of the body member 16. The aperture 38 has a smaller diameter than the internal diameter of the ferrule 18. The collar 34 has a diameter larger than that of the aperture 38 but small enough to permit it to slide along the main axis of the body member within the ferrule 18. The cylindrical body of the shank 24 to which the collar 34 is attached passes through the aperture 38 and is of sufficiently small diameter so as to be able to slide therein. The collar 34 slides on the inner surface of the ferrule 18 and thus stabilizes the shank.

Means is provided to releasably hold the arms 22 in their infolded position, i.e. to releasably prevent outflying movement thereof. For such purpose each arm 22 has extending from its free end two spaced diametrically-opposed pointed tips 40. When the arms 22 are in their compressed (infolded) position, and the shank 24 is forwardly disposed within the body member 16, the tips 40 may be caught within the bevelled or depressed margin 41 on the inner periphery of the flange 36.

Means urges the arms 22 and shank 24 jointly toward the rear end of the body member 16 and hence toward the wall 14. This means comprises a helical coil compression spring 42 disposed about the shank 24 within the ferrule 18 between the flange 36 and the collar 34. The spring 42 is seated on one side against the flange 36 and presses on the other side against the collar 34 so as to bias the shank 24 rearwardly relative to the body member 16. This urging of the shank 24 will, if the arms 22 are infolded, force the tips 40 into the depressed margin 41 of the flange 38, and, if the arms 22 are expanded, force the tips 40 against the hidden or hollow side of the wall 14.

The rearward end of the shank 24 presents an internally threaded bore 44 to the exposed side of the wall 14 and is thereby adapted to couple with a male fastener 46, e.g. a screw, which passes through a hole 48 in an object 50 which is desired to be fastened to the wall 14.

The operation of my fastening receptacle 10 is, as will be immediately evident, simple and quick. Prior to entry into the hole 12, the fastening receptacle 10 desirably, although not necessarily, is arranged in its infolded condition with the tips 40 of the arms 22 caught within the depressed margin 41 on the inner periphery of the flange 36. The tips 40 are urged rearwardly and so into this margin by the force of the spring 42 on the shank 24.

With the receptacle in this condition, the arms 22 do not protrude beyond the transverse outline of the ferrule 18 and so the receptacle, arms-end-first, can be inserted into the hole 12. The body member 16 can pass through the hole 12 until the lip 20 of the body member seats against the exposed surface of the wall 14, preventing further passage. At this point, the loci of the tips 40 about the rivet 28 do not strike the hidden or interior surface of the wall 14. The receptacle 10 may be easily inserted into the hole 12 by hand.

With the lip 20 against the wall surface, a screwdriver 52 or any slender instrument (e.g. a nail) is inserted into the body member 16 and the collar 34 is pushed forwardly therewith against the bias of the spring 42 in a direction indicated by arrow A of FIG. 3.

The shank 24, to which the collar 34 is joined, is thereby slid forwardly, carrying the tips 40 of the arms 22 forwardly of and consequently transversely clear of the depressed margin 41 formed by the flange 36. The screwdriver is then withdrawn.

The moment the tips 40 were unobstructed, the arms 22 flew open, due to the urging of the wire spring 32, and thus assumed a transverse outline substantially greater than that of the hole 12. The position of the receptacle at this moment is shown in FIG. 3.

As soon as the screwdriver 52 or like instrument is removed, the coil spring 42 urged the shank 24 toward the body member 16, the shank moving rearwardly until the tips 40 of the arms 22 strike the hidden surface of the wall 14. This condition is shown in FIG. 4. At this point, it will be noted that the receptacle secures itself to the wall 14, the lip 20 pressing against one side of the wall 14 and the tips 40 lightly biting into the other side of the wall. The receptacle thus smartly grasps the wall 14 from both sides with the force of the spring 42. And the receptacle 10 was brought to this condition by no more than a poke with a slender instrument. As is now evident, no time-consuming and inconvenient turning of a screw was necessary to achieve this position.

The receptacle 10 is now ready for engagement with a male fastener as by receiving the screw 46, which has been placed through the hole 48 in the object 50, in its internally-threaded rearwardly opening bore 44 in the shank 24. Tightening of the screw 46 pulls the shank 26 rearwardly and the tips 40 deeply and firmly into the hidden surface of the wall 14 as shown in FIGS. 2 and 5 so as to make a strong and secure connection with the wall.

The screw 46 may be removed at any time from the fastening receptacle 10 without effect on the receptacle's grip on the wall 14. The screw 46 may be removed and re-inserted as often as desired with the receptacle 10 remaining in position in the hole 12.

It thus will be seen that I have provided a device which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful and desire to secure by Letters Patent,

1. A self-securing fastening receptacle adapted to be inserted into a hole in a hollow wall and to secure itself and to hold itself secured to the wall prior to coupling with a male fastener, said receptacle comprising a hollow body member open at both ends and externally configured to be insertable into said hole from the exposed side of the wall, stop means carried by and protruding transversely outwardly from the exposed end of the hollow body member so as to seat against the exposed surface of the wall, a floating member freely axially slidably telescopable in the hollow body member and having a hidden end protruding from the open hidden end of the body member, first spring means axially urging the hollow body member and the floating member into telescoped relation, extendible means movable from a contracted position to an expanded position, second spring means biasing the extendible means to its expanded position, said extendible means including at least one arm, means pivotally mounting said arm on the protruding hidden end of the floating member for pivotal movement between said contracted position and said expanded position, said arm in said contracted position having a transverse outline not greater than the transverse outline of the hole and in said expanded position having a transverse outline greater than the transverse outline of the hole, and means removably retaining the arm in said contracted position and the floating member and the hollow body member in the extended position, whereby after the receptacle is inserted into the hole in the wall and the floating member is pressed rearwardly through the open exposed end of the hollow body member and then released, the extendible means proceeds simultaneously to its expanded position under the influence of the second spring means and is urged towards the hidden surface of the wall under the influence of the first spring means so that the wall is gripped between the stop means and the extendible means, the floating member further including a bore, said bore having means to interengage a male fastener.

2. In combination, a male fastener and a self-securing fastening receptacle adapted to be inserted into a hole in a hollow wall and to secure itself and to hold itself secured to the wall prior to coupling with said male fastener, said receptacle comprising a hollow body member open at both ends and externally configured to be insertable into said hole from the exposed side of the wall, stop means carried by and protruding transversely outwardly from the exposed end of the hollow body member so as to seat against the exposed surface of the wall, a floating member freely axially slidably telescopable in the hollow body member and having a hidden end protruding from the open hidden end of the body member, first spring means axially urging the hollow body member and the floating member into telescoped relation, extendible means movable from a contracted position to an expanded position, second spring means biasing the extendible means to its expanded position, said extendible means including at least one arm, means pivotally mounting said arm on the protruding hidden end of the floating member for pivotal movement between said contracted position and said expanded position, said arm in said contracted position having a transverse outline not greater than the transverse outline of the hole and in said expanded position having a transverse outline greater than the transverse outline of the hole, and interengaging means between the end of the arm and the hollow body member, said means removably retaining the arm in contracted position, whereby after the receptacle is inserted into the hole in the wall and the floating member is pressed rearwardly through the open exposed end of the hollow body member and then released, the extendible means proceeds simultaneously to its expanded position under the influence of the second spring means and is urged towards the hidden surface of the wall under the influence of the first spring means so that the wall is gripped between the stop means and the extendible means, the floating member further including a tapped bore and the male fastener including a threaded shank whereby when the male fastener passes through a hole in an object and into threaded relation with the tapped bore, continued rotation of the fastener draws the extendible means into tighter gripping abutment with the hidden surface of the wall.

3. A self-securing fastening receptacle adapted to be inserted into a hole in a hollow wall and to secure itself and to hold itself secured to the wall prior to coupling with a male fastener, said receptacle comprising a hollow body member open at both ends and externally configured to be insertable into said hole from the exposed side of the wall, stop means carried by and protruding transversely outwardly from the exposed end of the hollow body member so as to seat against the exposed surface of the wall, a floating member freely axially telescopable in the hollow body member and having a hidden end protruding from the open hidden end of the body member, first spring means axially urging the hollow body member and the floating member from an extended position into telescoped relation, extendible means movable from a contracted position to an expanded position, second spring means biasing the extendible means to its expanded position, said extendible means including at least one arm, means pivotally mounting said arm on the protruding hidden end of the floating member for pivotal movement between said contracted position and said expanded position, said arm in said contracted position having a transverse outline not greater than the transverse outline of the hole and in said expanded position having a transverse outline greater than the transverse outline of the hole, interengaging means between the end of the arm and the hollow body member removably retaining the arm in its contracted position, whereby after the receptacle is inserted into the hole in the wall and the floating member is pressed rearwardly through the open exposed end of the hollow body member and then released, the extendible means proceeds simultaneously to its expanded position under the influence of the second spring means and is urged towards the hidden surface of the wall under the influence of the first spring means so that the wall is gripped between the stop means and the extendible means, the floating member further including a bore, said bore having means to interengage a male fastener.

4. In combination, a male fastener and a self-securing fastening receptacle adapted to be inserted into a hole in a hollow wall and to secure itself and to hold itself secured to the wall prior to coupling with said male fastener, said receptacle comprising a hollow body member open at both ends and externally configured to be insertable into said hole from the exposed side of the wall, stop means carried by and protruding transversely outwardly from the exposed end of the hollow body member so as to seat against the exposed surface of the wall, a floating member freely axially slidably telescopable in the hollow body member and having a hidden end protruding from the open hidden end of the body member, first spring means axially urging the hollow body member and the floating member into telescoped relation, extendible means movable from a contracted position to an expanded position, second spring means biasing the extendible means to its expanded position, said extendible means including at least one arm, means pivotally mounting said arm on the protruding hidden end of the floating member for pivotal movement between said contracted position and said expanded position, said arm in said contracted position having a transverse outline not greater than the transverse outline of the hole and in said expanded position having a transverse outline greater than the transverse outline of the hole, and interengaging means between the end of the arm and the hollow body member, said means removably retaining the arm in contracted position, whereby after the receptacle is inserted into the hole in the wall and the floating member is pressed rearwardly through the open exposed end of the hollow body member and then released, the extendible means proceeds simultaneously to its expanded position under the influence of the second spring means and is urged towards the hidden surface of the wall under the influence of the first spring means so that the wall is gripped between the stop means and the extendible means, the floating member further including a bore, said bore having means to interengage the male fastener.

5. The combination set forth in claim 4 wherein the means to interengage the male fastener constitutes a tapped bore and wherein the male fastener includes a threaded shank threadable into said bore.

References Cited by the Examiner

UNITED STATES PATENTS

| | | | |
|---|---|---|---|
| 1,153,797 | 9/1915 | Kegreisz | 85—3 |
| 1,349,344 | 8/1920 | O'Neill | 85—3 |
| 2,132,284 | 10/1938 | Bonham | 85—3 |
| 2,144,895 | 1/1939 | Place | 85—3 |
| 3,001,252 | 9/1961 | Erickson | 85—3 |
| 3,127,808 | 4/1964 | Drybread | 85—3 |
| 3,168,850 | 2/1965 | Tennican | 85—3 |

EDWARD C. ALLEN, *Primary Examiner.*

C. B. ELDERKIN, *Assistant Examiner.*